United States Patent
Chu et al.

(10) Patent No.: US 11,594,022 B2
(45) Date of Patent: Feb. 28, 2023

(54) POWER LINE GEORECTIFICATION

(71) Applicant: International Business Machines Corporation, Armonk, NY (US)

(72) Inventors: Linsong Chu, White Plains, NY (US); Mudhakar Srivatsa, White Plains, NY (US); Raghu Kiran Ganti, White Plains, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 236 days.

(21) Appl. No.: 17/098,501

(22) Filed: Nov. 16, 2020

(65) Prior Publication Data
US 2022/0156494 A1    May 19, 2022

(51) Int. Cl.
*G06V 20/10*    (2022.01)
*G06K 9/62*     (2022.01)
(Continued)

(52) U.S. Cl.
CPC ......... *G06V 20/182* (2022.01); *G06K 9/6215* (2013.01); *G06T 7/0002* (2013.01);
(Continued)

(58) Field of Classification Search
CPC .............. G06K 9/6215; G06T 11/00; G06T 2207/10032; G06T 2207/20212; G06T 2207/30184; G06T 2207/30188; G06T 7/0002; G06T 7/11; G06T 7/33; G06V 20/182
See application file for complete search history.

(56) References Cited

U.S. PATENT DOCUMENTS 8,396,293 B1   3/2013   Korah et al.
9,384,399 B2   7/2016   Bangay
(Continued)

FOREIGN PATENT DOCUMENTS

CN    103413133 B    10/2014
CN    104020475 A    3/2016
(Continued)

OTHER PUBLICATIONS

Nursinem Handan, "Power Line Corridor Mapping with Lidar," Lidar, Surveying Group news, Jul. 28, 2020. https://surveyinggroup.com/power-line-corridor-mapping-with-lidar/ (Year: 2020).*
(Continued)

*Primary Examiner* — Sing-Wai Wu
(74) *Attorney, Agent, or Firm* — Cantor Colburn LLP; Joseph Petrokaitis

(57) ABSTRACT

Aspects of the invention include generating a combined raster image from point cloud data and reference data describing an original location of a power line. Selecting a set of candidate pixels from the combined raster image describing an updated location of a power line, wherein the selection is based at least in part on a location of pixels in the combined raster image that describe the original location. Detecting pixels from the set of candidate pixels that describe an updated location of a power line. Modifying the combined raster image to reflect the updated location of the power line.

20 Claims, 6 Drawing Sheets

(51) Int. Cl.
*G06T 7/00* (2017.01)
*G06T 7/11* (2017.01)
*G06T 11/00* (2006.01)

(52) U.S. Cl.
CPC ............. *G06T 7/11* (2017.01); *G06T 11/00* (2013.01); *G06T 2207/10032* (2013.01); *G06T 2207/20212* (2013.01); *G06T 2207/30188* (2013.01)

(56) References Cited

U.S. PATENT DOCUMENTS

| | | | |
|---|---|---|---|
| 9,734,398 | B2 | 8/2017 | Chen et al. |
| 9,784,836 | B2 | 10/2017 | Heinonen et al. |
| 10,643,072 | B2 | 5/2020 | Kottenstette et al. |
| 2009/0185741 | A1* | 7/2009 | Nahari ............... G01C 15/002 382/154 |
| 2012/0027298 | A1 | 2/2012 | Dow et al. |
| 2013/0066600 | A1 | 3/2013 | Rousselle et al. |
| 2015/0131079 | A1 | 5/2015 | Heinonen et al. |
| 2019/0107572 | A1* | 4/2019 | Williams ............ G01R 31/085 |
| 2019/0235011 | A1 | 8/2019 | Pinney et al. |
| 2019/0317239 | A1 | 10/2019 | Olsson et al. |
| 2019/0382111 | A1 | 12/2019 | Schwartz et al. |
| 2020/0074176 | A1 | 3/2020 | Birchbauer et al. |
| 2020/0184194 | A1 | 6/2020 | Edara et al. |
| 2021/0073692 | A1 | 3/2021 | Saha et al. |

FOREIGN PATENT DOCUMENTS

| | | |
|---|---|---|
| CN | 104751481 B | 6/2016 |
| CN | 104484882 B | 9/2017 |
| CN | 110221603 A | 9/2019 |
| CN | 111159451 A | 5/2020 |
| CN | 111650599 A | 9/2020 |
| CN | 111680673 A | 9/2020 |
| KR | 101404655 B1 | 6/2014 |

OTHER PUBLICATIONS

C. D. Lippitt, "DC-30—Georeferencing and Georectification," The Geographic Information Science & Technology Body of Knowledge (3rd Quarter 2020 Edition). John P. Wilson (Ed.). https://web.archive.org/web/20200819000714/https://gistbok.ucgis.org/bok-topics/georeferencing-and-georectification (Year: 2020).*

Chu et al., "Power Line Extraction Using Reference Data," U.S. Appl. No. 17/098,498, filed Nov. 16, 2020.

IBM "List of IBM Patents or Patent Applications Treated as Related; (Appendix P)", Filed Nov. 16, 2020, 2 pages.

International Search Report and Written Opinion; dated Jan. 12, 2022; Application No. PCT/CN2021/123781; Filed: Oct. 14, 2021; 10 pages.

Fryskowska, "Improvement of 3D Power Line Extraction from Multiple Low-Cost UAV Imagery Using Wavelet Analysis"; Sensors 2019, 19, 700. 24 Pages.

Guan-et al. "Extraction of power-transmission lines from vehicle-borne lidar data"; International Journal of Remote Sensing, 2016; vol. 37, No. 1, 229-247. 21 pages.

Lehtomäkiaet al. "Power line mapping technique using all-terrain mobile laser scanning"; Automation in Construction 105 (2019) 102802. 16 Pages.

Wang-etal, "Supervised Classification of Power Lines from Airborne LiDAR Data in Urban Areas"; Remote Sens. 2017, 9, 771. pp. 16.

Zhao et al. "Power Line Extraction From Aerial Images Using Object-Based Markov Random Field With Anisotropic Weighted Penalty" IEEE Access; 2019, vol. 7, pp. 125333-125356 24 Pages.

* cited by examiner

POWER LINE GEORECTIFICATION

BACKGROUND

The present invention relates in general to programmable computing systems, and more specifically, to programmable computing systems configured to perform power line georectification.

Energy companies and municipalities use locations of power lines as decision making criteria for various initiatives, such as mitigating the possibility of any surrounding vegetation interacting with power lines. Due to the expansive footprint of many power line systems, on-site inspections can be expensive and subject to human error. Instead, the companies and municipalities rely on computing systems that are programmed to receive image data to differentiate and identify any power lines described by the data. The computing systems can further provide locations of the power lines by complementing the image data with spatial coordinates.

SUMMARY

Embodiments of the present invention are directed to power line georectification. A non-limiting example computer-implemented method includes generating a combined raster image from point cloud data and reference data describing an original location of a power line. Selecting a set of candidate pixels from the combined raster image describing an updated location of a power line, wherein the selection is based at least in part on a location of pixels in the combined raster image that describe the original location. Detecting pixels from the set of candidate pixels that describe an updated location of a power line. Modifying the combined raster image to reflect the updated location of the power line.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagrams or the operations described therein without departing from the spirit of the invention. For instance, the actions can be performed in a differing order, or actions can be added, deleted, or modified. Also, the term "coupled" and variations thereof describes having a communications path between two elements and does not imply a direct connection between the elements with no intervening elements/connections between them. All of these variations are considered a part of the specification.

DETAILED DESCRIPTION

One or more embodiments of the present invention provide computer-implemented methods, computing system, and computer program products for encoding point cloud data and reference data into a raster image and extracting a power line location from the raster image.

Energy companies and municipalities rely on maps of power lines for planning and risk management. For example, vegetation mitigation relies on understanding a distance between vegetation and a power line. Unfortunately, maps defining locations of power lines were generated when the ability to determine spatial coordinates of points of interest was not accurate. As a result, an actual power line can be located tens of meters away from a location described in reference map data. Conventional power line extraction systems apply rule-based algorithms that can be difficult to generalize as different scenarios require different rules. For example, one set of rules can be applied to an aerial image describing power lines surrounded by trees. The set of rules can be directed towards filtering out data points describing trees. However, this set of rules would not be effective for an aerial image, in which a power line was covered by a tree canopy.

One or more embodiments of the present invention address one or more of the above-described shortcomings by providing computer-implemented methods, computing systems, and computer program products that encode information into images by performing rasterization on point cloud data and reference data. During rasterization, feature channels are created to capture useful information in the point cloud data. Furthermore, a binary mask channel can be created to encode a location of a power line from the reference data. A neural network can use the feature channels and binary mask to perform georectification and update a location of the power line. By combining newly captured data and reference data to generate features channels and binary masks that guide a neural network, a power line extraction system can forego costly rules-based methods and identify accurate locations of power lines.

Figure 1:
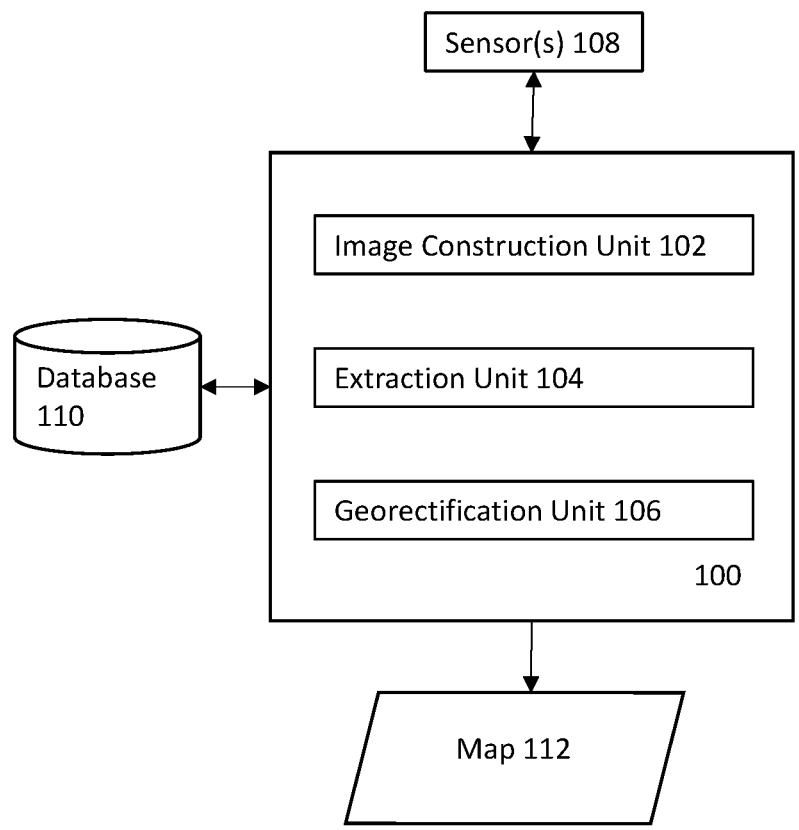
FIG. 1 illustrates a block diagram of components of a power line extraction system, in accordance with one or more embodiments of the present invention.

Turning now to FIG. 1, a power line extraction system 100 is generally shown in accordance with one or more embodiments of the present invention. The system 100 includes an image construction unit 102 for encoding point cloud data and reference data into an image. The system 100 further includes an extraction unit 104 for identifying a power line from the image data. The system 100 includes a georectification unit 106 for generating a certified map of the power line.

The image construction unit 102 is operable to receive point cloud data and rasterize the data to convert it into an image. The image construction unit 102 can receive the point cloud data and segment the data into a grid(s) over a target area. Each grid can be composed of m×n cells and be associated with a respective channel, or data characteristic. Each cell can include a value associated with the channel. The image construction unit 102 can use the values to generate a raster image, in which each pixel of the raster image is associated with a cell of the grid(s). A raster image can be described as a bitmap image composed of a series of pixels, dots or lines, which, when displayed together, display the image described by the grid values. The raster image can be in various formats such as JPG, GIG, and PNG. For example, if the image construction unit 102 encodes the point cloud data as a grayscale raster image, each grid cell can a value between 0 and 255 to represent a brightness of a pixel. If the image construction unit 102 generates an RBG image, the image construction unit 102 would generate at least three grids, one for red, one for blue, and one for green. Each cell of each grid includes a respective value for a brightness of the red, blue, or green color. In each case, the image construction unit 102 generates an n-channel raster image describing a target area.

Each cell in a grid can represent a geospatial position on the target area. Furthermore, for each grid of the n-channel image, similarly positioned cells represent the same spatial position on the target area. For example, each cell in a top row of cells of a first grid represent the same geospatial positions as the top row of cells in a second grid. Therefore, each grid can be overlaid on each other grid to describe the same target area. A spatial position of a grid cell can be related to a geographic coordinate system. For example, the image construction unit 102 can generate a grid such that a cell can represent a particular longitudinal, latitudinal, and elevation position of the target area.

The image construction unit 102 can further receive reference data and convert the data into another raster image. The image construction unit 102 can segment the reference data into a reference grid having the same geospatial location of the re-channel raster image. The reference data can describe a portion of the target area. The reference data can include at least one or more inaccurate position of a power line. The reference grid describes a position of the power line in terms of binary values. For example, a cell can have a value of 1 if the cell represents a position in which a power line is present. Alternatively, a cell can have a value of 0, if the cell represents a position in which a power line is not present. The raster image derived from the reference grid can be a binary image in the form of a single channel e×f reference raster image representing a position of a power line as described in the reference data. For example, each pixel of the image that includes a power line can be black, whereas each cell of the image that does not include a power line can be white.

The image construction unit 102 is operable to encode the n-channel grids with the reference grid to generate an n+1 channel image. In other words, the point cloud data is combined to and the reference data has been converted into a combined image that visually describes the target area and a previously determined location of a power line(s) at the target area. In the field of neural networks, deep learning techniques include receiving a set of data and learning which features to extract to accomplish a particular task. However, models employed by neural networks can misclassify data or misbehave. These issues are exacerbated in the presence of small training data sets. By converting the data into a raster image, the image construction unit 102 can employ computer vision techniques that enables a deep learning neural network, for example, an artificial neural network (ANN), to extract more meaningful features than a rules-based analysis of raw numbers.

The extraction unit 104 is operable to receive an n+1 channel raster image from the image construction unit 102 and employ a model to identify objects in the image. The extraction unit 104 can employ a model that executes computer vision techniques on the n+1 channel image for object detection. Object detection includes both image classification and object localization. Image classification includes predicting a class of one or more objects in the n+1 channel image. To perform image classification, the image construction unit 102 receives the n+1 channel raster image as an input and outputs a class label in the form of one or more integer values mapped to class values. Object localization includes identifying a location of the one or more identified objects in the n+1 channel raster image. To perform object localization, the extraction unit 104 can process the received n+1 channel raster image and output one or more bounding boxes, which define a spatial relationship of the objects in the n+1 channel raster image. The bounding boxes can conform to a portion of an entirety of a grid. The extraction unit 104 can be implemented through a neural network type architecture with input, hidden, and output layers. The extraction unit 104 can be trained to detect objects from a particular domain (e.g., utilities, energy) by adjusting the weights and biases of the neural network.

An exemplary embodiment, the extraction unit 104 employs a trained artificial neural network to execute the model, for example, a region-based convolutional neural network (R-CNN), or other neural network appropriate for image analysis. The R-CNN generally operates in three phases. First, the R-CNN analyzes the n+1 channel image, extracts independent regions in the n+1 channel image, and delineates the regions as candidate bounding boxes. Second, the R-CNN extracts features, for example, using a deep convolutional neural network, from each region. Third, a classifier, for example, a support vector machine (SVM), is used to analyze the features and predict a class for one or more objects in a region.

The extraction unit 104 is trained to detect particular features, in the n+1 channel raster image to distinguish a power line from other objects in the image. The extraction unit 104 can apply computer vision, image analysis, and/or image processing to identify power lines from pixels of the n+1 channel raster image. The n+1 channel raster image include pixels that describe a location of a power line based on reference. Even though the reference data includes inaccurate locations of power line(s), the reference data pixels can still be utilized to guide the extraction unit 104. The mapping can include three-dimensional and two-dimensional mappings. However, notwithstanding the inaccuracies, the reference data includes valuable information for reducing the computational requirements for a power line extraction system. For example, a power line described by reference data may actually be twenty meters in some direction (e.g., north, south, east, or west) of an actual power line. However, even if the location is inaccurate, the power line described in the reference data is generally parallel with the actual power line. Additionally, the power line described in the reference data is generally within a threshold distance of the actual power line.

The extraction unit 104 can analyze each pixel (grid cell) of a raster image to extract features that suggest that the pixel describes a power line or does not describe a power line. For example, the extraction unit 104 can analyze each value of each overlapping grid cell. Overlapping grid cells are the cells associated with the same spatial location in the n-channel raster image. The extraction unit 104 can compare the values of the grid cells to find values that are associated with power lines. The values can be related to color, elevation, density similar pixels, or other characteristics described by the channels. The extraction unit 104 can further perform a histogram analysis other a set of values associated with a pixel. The extraction unit 104 can further utilize the reference data to guide the extraction process. For example, even if a power line location according to reference data is inaccurate, the actual location is expected to be within a threshold distance of the reference data power line location. Therefore, the extraction unit 104 can limit it is analysis to candidate pixels within a threshold range apart from a reference line pixel. Additionally, even if reference power lines are at inaccurate locations, the reference power lines are parallel to actual power lines locations. Therefore, the extraction unit 104 can analyze pixels that form parallel lines with the reference power lines and disregard other pixels. Based on the analysis of the pixels, the extraction unit select candidate pixels that describe accurate locations of power lines.

The extraction unit 104 model can be trained to determine an optimal threshold distance. For example, during training, the extraction unit 104 can receive a batch of training data. The training batch of data can include reference data with inaccurate positions of power lines. A difference between an actual position of a power line and an inaccurate location of a power line can be represented as $\Delta_\phi$. For training purposes, a difference $\Delta_\phi$ can be replaced with $\Delta_\lambda$ to increase the number of training instances and train the extraction unit 104 model with a greater variety of differences.

The georectification unit 106 can receive the analysis from the extraction unit 104 and reconcile the determined location of a power line with the n-channel raster image. By modifying the values of the reference grid to comport with the update location of the power line. The georectification unit 106 can change the binary values of the reference grid to update the location of the power line. For example, a georectification unit 106 can convert a one to a zero or a zero to a one. The georectification unit 106 can further generate an updated n+1 channel image with an updated location of the power line.

As used herein, "machine learning" broadly describes a function of electronic systems that learn from data. A machine learning system, engine, or module can include a machine learning algorithm that can be trained, such as in an external cloud environment (e.g., the cloud computing environment 50), to learn functional relationships between inputs and outputs that are currently unknown. In one or more embodiments, machine learning functionality can be implemented using an artificial neural network (ANN), having the capability to be trained to perform a currently unknown function. In machine learning and cognitive science, ANNs are a family of statistical learning models inspired by the biological neural networks of animals, and in particular, the brain. ANNs can be used to estimate or approximate systems and functions that depend on a large number of inputs.

ANNs can be embodied as so-called "neuromorphic" systems of interconnected processor elements that act as simulated "neurons" and exchange "messages" between each other in the form of electronic signals. Similar to the so-called "plasticity" of synaptic neurotransmitter connections that carry messages between biological neurons, the connections in ANNs that carry electronic messages between simulated neurons are provided with numeric weights that correspond to the strength or weakness of a given connection. The weights can be adjusted and tuned based on experience, making ANNs adaptive to inputs and capable of learning. For example, an ANN for handwriting recognition is defined by a set of input neurons that can be activated by the pixels of an input image. After being weighted and transformed by a function determined by the network's designer, the activation of these input neurons is then passed to other downstream neurons, which are often referred to as "hidden" neurons. This process is repeated until an output neuron is activated. The activated output neuron determines which character was read.

The sensor(s) 108 can be any sensor operable to collecting image data. The image data can include any data or combination of data used to generate a two-dimensional or three-dimensional description of a target area, for example, a point cloud. The sensor(s) 108, for example, can include a remote imaging sensor such as a visible light capturing sensor, moderate-resolution imaging spectroradiometer (MODIS), airborne laser scanning (ALS) sensor, Visible Infrared Imaging Radiometer Suite (VIIRS), or a Light Detection and Ranging system (LIDAR) acquired at different wavelengths, that can capture spectral data. The data received from the sensor(s) 108 can include data that describes an elevation of a terrain of the target location, for example digital terrain data. The terrain data can be used to calculate a height of a data point in relation to a topology of a target area. The terrain data can also be retrieved from an external source and combined with the data received from the sensor(s) 108. The database 110 can be any database that stores reference data. The reference data can be a previously determined location of power line.

Figure 2:
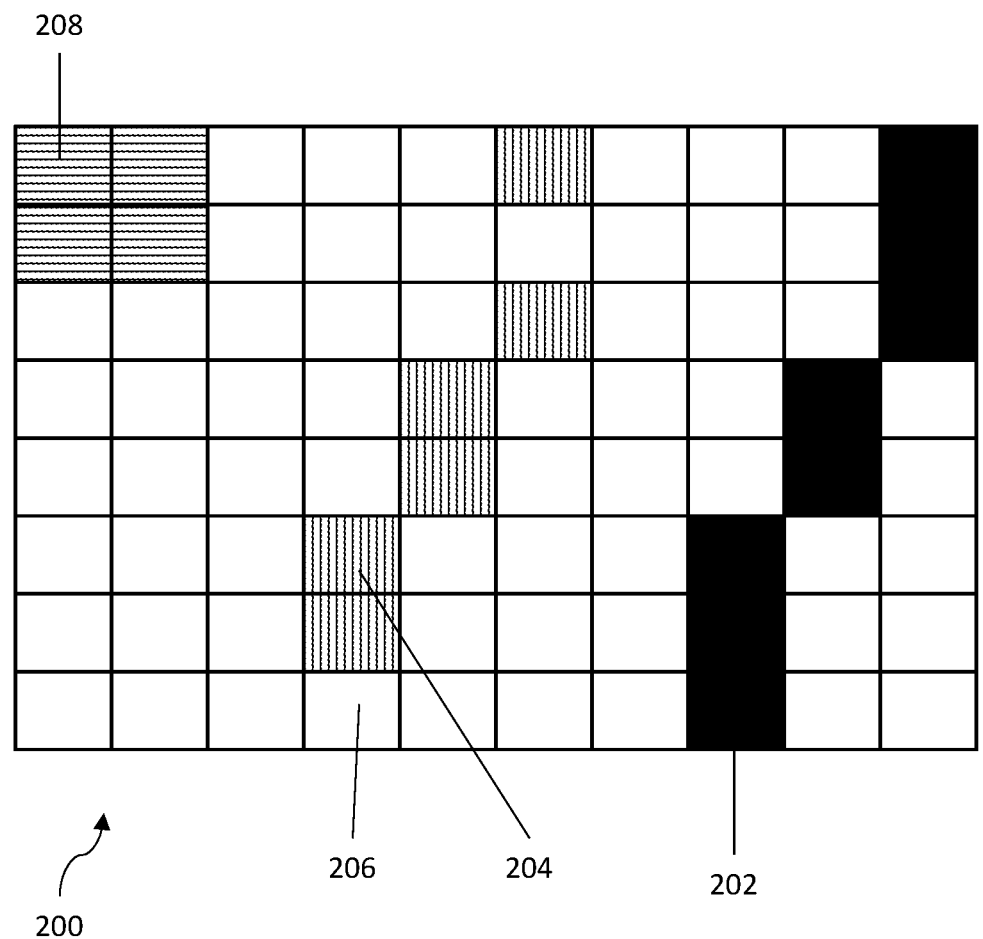
FIG. 2 illustrates a raster image of a power line in accordance with one or more embodiments of the present invention.

Referring to FIG. 2, an illustration of raster image 200 describing a target area is shown. The raster image includes eight pixels in each column and ten pixels in each row for a total of eighty pixels. Each pixel can be associated with a cell of n+1 overlapping grids. Each cell can include a value describing a characteristic associated with a respective grid. Each cell is associated with a geospatial location on the earth. The raster image 200 includes reference pixels 202 associated with a location of a power line according to the reference data. The reference pixels 202 have been blackened for illustration purposes. The reference pixels are still associated with values of associated cells of the other grids, but are visually altered based on the binary values of the reference grid. The raster image 200 further includes power line pixels 204 describing an actual location of a power line based on the point cloud data. The power line pixels have vertical lines for illustration purposes. As seen, the power line pixels 204 do not conform exactly to the reference pixels 202, as the point cloud data does not always return a complete set of data points and missing pixels 206 are present. The raster image 200 also includes object pixels 208, that do not describe actual power lines or reference power lines. The objects can include vegetation, buildings, or other objects. The object pixels 208 include horizontal lines for illustration.

The herein described extraction unit 104 can analyze each pixel and extract features that suggests that a pixel describes a power line. The extraction unit 104 can further apply the features as inputs and generate a classification as to whether each pixel describes a power line. The extraction unit 104 can further use characteristics of the reference pixels 202 to focus on particular pixels. For example, the extraction unit can focus only on pixels within a threshold numbers of pixels apart from the reference pixels 202. Within those pixels that are a threshold distance apart, the extraction unit 104 can only analyze pixels that, if combined would form parallel line segments with the reference pixels 202. The extraction unit 104 can analyze the grid values of each pixel and exclude from consideration, pixels that describe objects that are greater than or less than an threshold elevation range. The georectification unit 106 can receive the analysis of the pixels from the extraction unit 104, and amend the reference grid values describing the reference pixels 202 to conform to an updated location of the power line. For example, the georectification unit 106 can update the grid values such that the raster image 200 displays blackened pixels where the formerly power line pixels 204 and the missing pixels 206 were displayed. The former blackened pixels can display images based on the values of associated cells of the other grids.

Figure 3:
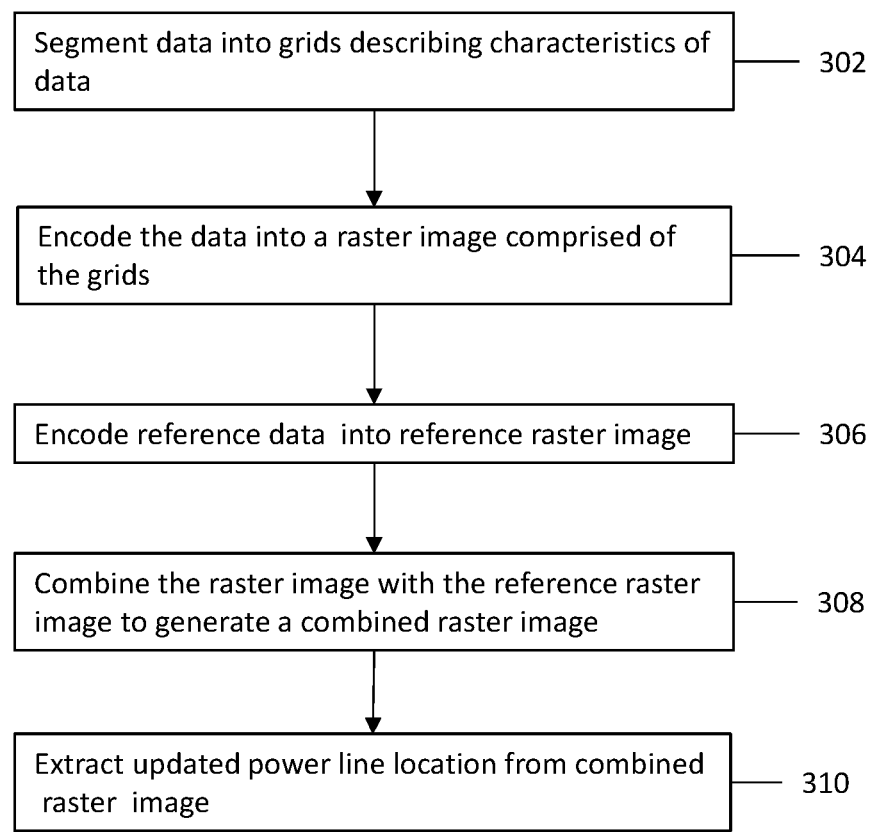
FIG. 3 illustrates a flow diagram of a process for power line extraction in accordance with one or more embodiments of the present invention.

Referring to FIG. 3, a flow diagram 300 of a process for power line extraction in accordance with one or more embodiments of the present invention is shown. It should be appreciated that all or a portion of the processing shown in FIG. 3 can be performed by a computer system, such as system 100 of FIG. 1. At block 302, an image construction unit 102 can segment data over a target area into m×n overlapping grid(s). Each cell of a grid is associated with a geospatial position of target area. The data can be high-density point cloud data returned from a LIDAR system. For each desired characteristic (channel), the image construction unit 102 can generate an m×n grid. The image construction unit 102 can populate cells of each grid with respective values related to the characteristic described by the grid. The image construction unit 102 can derive the values by analyzing the point cloud data points that fall within each grid cell. It is possible for certain cells to not include any values. The characteristics can include visual characteristics, for example red, blue, or green values. The characteristics can also include spatial characteristics, such as densities of point cloud data points in a grid, spatial distance between data points, elevation between a data point and a surface of target location.

At block 304, the image construction unit 102 can generate a raster image from the grid. The image construction unit 102 can combine the grids and generate a re-channel raster image, in which each a grid cell is associated with a pixel of the raster image. The image construction unit 102 can overlap the grids based on the matching geospatial positions of the grid cells. Each pixel of the n-channel raster image can be associated with each value of each associated grid cell. The image construction unit 102 can analyze the values of each grid cell to determine a visual characteristics. For example, the image construction unit 102 can analyze the values of overlapping cells of grid for red, blue, and green color, and determine a pixel color based on the values.

At block 306, the image construction unit 102 can encode reference data into a single channel raster image. The reference data can be previously generated location data of one or more power lines. One or more location of the power lines in the reference data can be inaccurate. An inaccurate location is a location that is a threshold distance apart from the actual power line location. For example, the reference data may place a powerline segment thirty meters to the east, west, north, or south of the actual location of the power line. If, for example, the threshold distance is five meters, the power line segment is at an inaccurate location according to the reference data. In some embodiments of the present invention, the location can be measured based on a pylon location, a center point of a power line segment, or other appropriate measurement location. The raster image can be a binary image in the form of a single channel e×f reference image representing a position of a power line as described in the reference data. The e×f reference image can be positioned on a same spatial grid as the n-channel image.

At block 308, the image construction unit 102 can combine the n-channel raster image with the single channel e×f reference raster image. The resulting image is a n+1 channel raster image that includes both the reference data and point cloud data. The point cloud data can be acquired at a later date than the reference data. For example, the reference data can have been generated days, months or years before the point cloud data. The image construction unit 102 can overlap each grid of the n-channel raster image with the grid of the e×f reference raster image based on the matching geospatial locations of the grid cells. The image construction unit 102 can determine a visual aspect of each pixel of the n+1 channel raster image by analyzing the values of each grid cell associated with a pixel, and displaying a pixel pattern based on the values.

At block 310, the extraction unit 104 can extract an updated power line location from the from the n+1 channel raster image. The extraction unit 104 can analyze each pixel including the values of each grid cell associated with a respective pixel. To reduce a number of computations, the extraction unit 104 can utilize the reference data pixels to exclude pixels from further analysis. For example, the extraction unit 104 calculate a number of pixels between a target pixel and a reference pixel. The number of pixels between the target pixel and a reference pixel can be positioned horizontally along a row, vertically along a column, or diagonally between the two pixels. The extraction unit 104 can then compare the distance to a threshold range of pixels. If the number of pixels between a target pixel and a reference pixel is less than an upper distance range or greater than a lower distance range, the extraction unit 104 can determine that the target pixel is a candidate pixel and continue analysis. If, however, the number of pixels between a target pixel and any reference pixel is greater than an upper distance range or less than a lower distance range, the extraction unit 104 can determine that the target pixel is not candidate pixel and discontinue analysis.

The extraction unit 104 can further exclude pixels by determining whether the remaining candidate pixels describe a power line that is parallel to the reference power line. The extraction unit 104 can compare a location of each pixel of a reference power line to a location of candidate pixels. The extraction unit 104 can then determine whether a set of candidate points describes a power line parallel to the reference power line. For example, if the threshold distance range is between three and six pixels, the extraction unit 104 can determine whether a set of candidate pixels describes a power line three pixels apart from reference power line, four pixels apart from reference power line, five pixels apart from reference power line, and/or six pixels apart from reference power line. In each instance, the extraction unit 104 can determine whether a threshold number of candidate pixels are located along a potential parallel power line path. If a number of candidate points exceeds the threshold number, the extraction unit 104 can continue to analyze the candidate points along the potential parallel power line path. If the number of candidate points does not exceed the threshold number, the extraction unit 104 can discontinue analyzing the candidate points along the parallel power line path.

At block 310, the extraction unit 104 can extract an updated power line location from the n+1 channel raster image. The extraction unit 104 can analyze the remaining candidate pixels to include analysis of the grid cell values associated with each remaining candidate pixels. The extraction unit 104 can further enter an input of the grid cell values into a model and output of classification as to each candidate pixel. The classification can include a label as whether the candidate pixel describes a power line or does not describe a power line.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
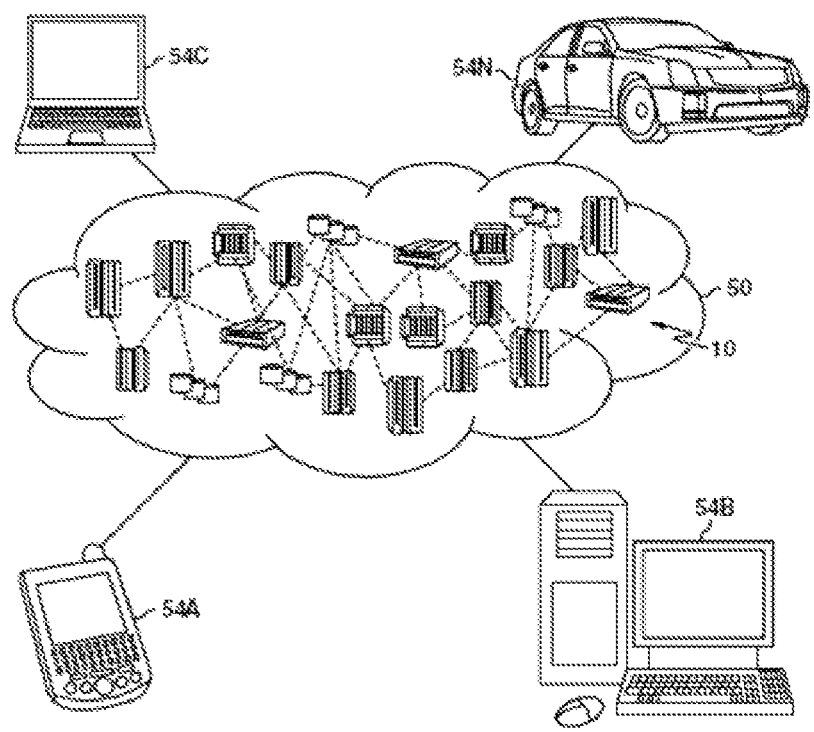
FIG. 4 depicts a cloud computing environment according to one or more embodiments of the present invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
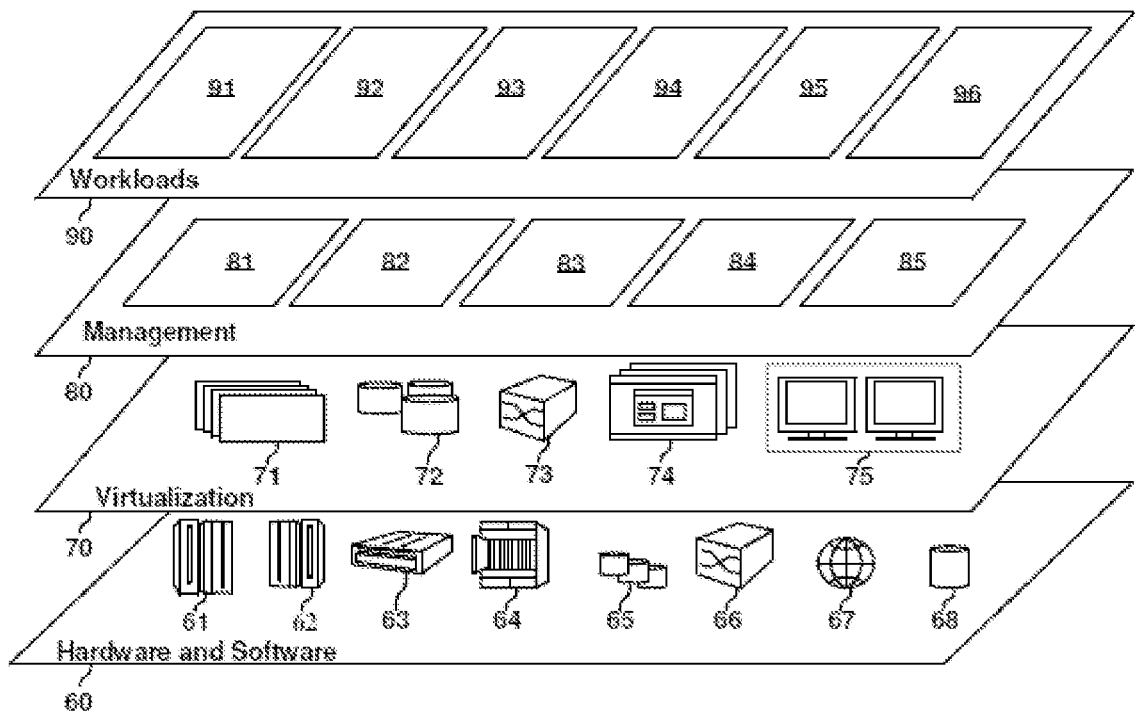
FIG. 5 depicts abstraction model layers according to one or more embodiments of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtualization 93; data analytics processing 94; transaction processing 95; and georectification 96.

Figure 6:
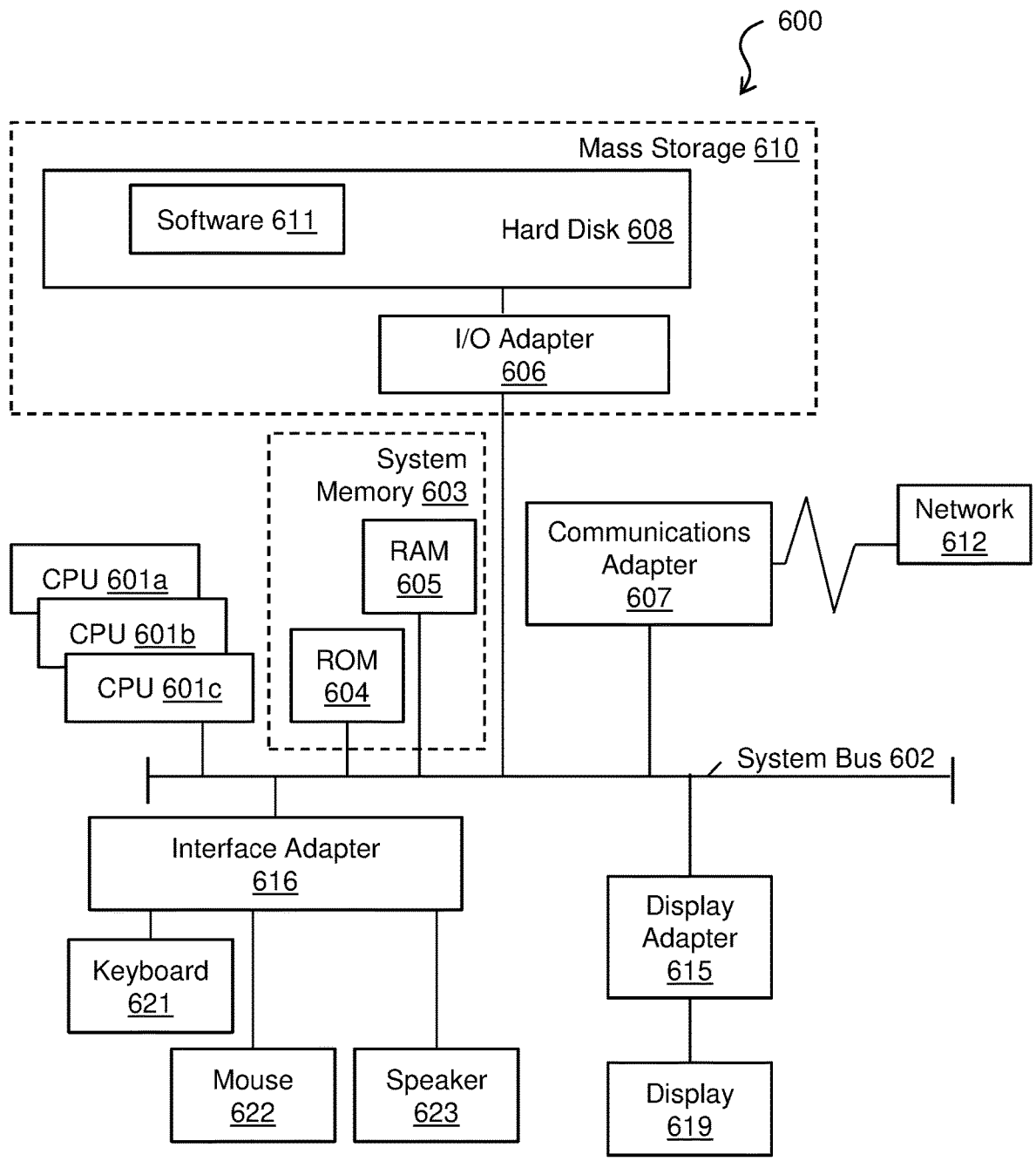
FIG. 6 depicts a block diagram of a computer system for use in implementing one or more embodiments of the present invention.

In one or more embodiments of the present invention, the hardware/software modules in the system 100 from FIG. 1 can be implemented on the processing system 600 found in FIG. 6. Turning now to FIG. 6, a computer system 600 is generally shown in accordance with an embodiment. The computer system 600 can be an electronic, computer framework comprising and/or employing any number and combination of computing devices and networks utilizing various communication technologies, as described herein. The computer system 600 can be easily scalable, extensible, and modular, with the ability to change to different services or reconfigure some features independently of others. The computer system 600 may be, for example, a server, desktop computer, laptop computer, tablet computer, or smartphone. In some examples, computer system 600 may be a cloud computing node. Computer system 600 may be described in the general context of computer system executable instructions, such as program modules, being executed by a computer system. Generally, program modules may include routines, programs, objects, components, logic, data structures, and so on that perform particular tasks or implement particular abstract data types. Computer system 600 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, the computer system 600 has one or more central processing units (CPU(s)) 601a, 601b, 601c, etc. (collectively or generically referred to as processor(s) 601). The processors 601 can be a single-core processor, multi-core processor, computing cluster, or any number of other configurations. The processors 601, also referred to as processing circuits, are coupled via a system bus 602 to a system memory 603 and various other components. The system memory 603 can include a read only memory (ROM) 604 and a random access memory (RAM) 605. The ROM 604 is coupled to the system bus 602 and may include a basic input/output system (BIOS), which controls certain basic functions of the computer system 600. The RAM is read-write memory coupled to the system bus 602 for use by the processors 501. The system memory 603 provides temporary memory space for operations of said instructions during operation. The system memory 603 can include random access memory (RAM), read only memory, flash memory, or any other suitable memory systems.

The computer system 600 comprises an input/output (I/O) adapter 606 and a communications adapter 607 coupled to the system bus 602. The I/O adapter 606 may be a small computer system interface (SCSI) adapter that communicates with a hard disk 608 and/or any other similar component. The I/O adapter 606 and the hard disk 608 are collectively referred to herein as a mass storage 610.

Software 611 for execution on the computer system 600 may be stored in the mass storage 610. The mass storage 610 is an example of a tangible storage medium readable by the processors 601, where the software 611 is stored as instructions for execution by the processors 601 to cause the computer system 600 to operate, such as is described herein below with respect to the various Figures. Examples of computer program product and the execution of such instruction is discussed herein in more detail. The communications adapter 607 interconnects the system bus 602 with a network 612, which may be an outside network, enabling the computer system 600 to communicate with other such systems. In one embodiment, a portion of the system memory 603 and the mass storage 610 collectively store an operating system, which may be any appropriate operating system, such as the z/OS or AIX operating system from IBM Corporation, to coordinate the functions of the various components shown in FIG. 6.

Additional input/output devices are shown as connected to the system bus 602 via a display adapter 615 and an interface adapter 616 and In one embodiment, the adapters 606, 607, 615, and 616 may be connected to one or more I/O buses that are connected to the system bus 602 via an intermediate bus bridge (not shown). A display 619 (e.g., a screen or a display monitor) is connected to the system bus 602 by a display adapter 615, which may include a graphics controller to improve the performance of graphics intensive applications and a video controller. A keyboard 621, a mouse 622, a speaker 623, etc. can be interconnected to the system bus 602 via the interface adapter 616, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 6, the computer system 600 includes processing capability in the form of the processors 601, and, storage capability including the system memory 603 and the mass storage 610, input means such as the keyboard 621 and the mouse 622, and output capability including the speaker 623 and the display 619.

In some embodiments, the communications adapter 607 can transmit data using any suitable interface or protocol, such as the internet small computer system interface, among others. The network 612 may be a cellular network, a radio network, a wide area network (WAN), a local area network (LAN), or the Internet, among others. An external computing device may connect to the computer system 600 through the network 612. In some examples, an external computing device may be an external webserver or a cloud computing node.

It is to be understood that the block diagram of FIG. 6 is not intended to indicate that the computer system 600 is to include all of the components shown in FIG. 6. Rather, the computer system 600 can include any appropriate fewer or additional components not illustrated in FIG. 6 (e.g., additional memory components, embedded controllers, modules, additional network interfaces, etc.). Further, the embodiments described herein with respect to computer system 600 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
generating, by a processor, a combined raster image from point cloud data and reference data describing an original location of a power line;
selecting, by the processor, a set of candidate pixels from the combined raster image describing an updated location of a power line, wherein the selection is based at least in part on a location of pixels in the combined raster image that describe the original location;
detecting, by the processor, pixels from the set of candidate pixels that describe an updated location of a power line; and
modifying, by the processor, the combined raster image to reflect the updated location of the power line.

2. The computer-implemented method of claim 1, wherein generating the combined raster image comprises:
segmenting point cloud data over a target area into a first grid, wherein each cell of the first grid is associated with a geospatial portion of the target area, and wherein each pixel of the combined raster image is associated with a cell of the first grid;
determining a respective value of a first characteristic for each cell of the first grid; and
determining a visual characteristic of each cell based on the respective value.

3. The computer-implemented method of claim 2, wherein generating the combined raster image further comprises:
segmenting reference data over a target area into a second grid, wherein each cell of the second grid is associated with a geospatial portion of the target area, and wherein each pixel of the combined raster image is associated with a cell of the second grid; and
combining the first grid and the second grid based on matching a geospatial portion associated with a first cell of the first grid with a geospatial portion associated with a first cell of the second grid.

4. The computer-implemented method of claim 3, wherein the original location of the power line is inaccurate.

5. The computer-implemented method of claim 3 further comprising generating a third grid by updating the values of the second grid to describe the updated location of the power line.

6. The computer-implemented method of claim 5 further comprising generating an updated raster image by combining the first grid with the third grid.

7. The computer-implemented method of claim 1, wherein selecting the set of candidate pixels is based at least in part on a number of pixels in between a candidate pixel of the set of pixels and a pixel describing the original location of the power line.

8. A system comprising:
a memory having computer readable instructions; and
one or more processors for executing the computer readable instructions, the computer readable instructions controlling the one or more processors to perform operations comprising:
generating a combined raster image from point cloud data and reference data describing an original location of a power line;
selecting a set of candidate pixels from the combined raster image describing an updated location of a power line, wherein the selection is based at least in part on a location of pixels in the combined raster image that describes the original location;
detecting pixels from the set of candidate pixels that describe an updated location of a power line; and
modifying the combined raster image to reflect the updated location of the power line.

9. The system of claim 8, wherein generating the combined raster image comprises:
segmenting point cloud data over a target area into a first grid, wherein each cell of the first grid is associated with a geospatial portion of the target area, and wherein each pixel of the combined raster image is associated with a cell of the first grid;
determining a respective value of a first characteristic for each cell of the first grid; and
determining a visual characteristic of each cell based on the respective value.

10. The system of claim 9, wherein generating the combined raster image further comprises:
segmenting reference data over a target area into a second grid, wherein each cell of the second grid is associated with a geospatial portion of the target area, and wherein each pixel of the combined raster image is associated with a cell of the second grid; and
combining the first grid and the second grid based on matching a geospatial portion associated with a first cell of the first grid with a geospatial portion associated with a first cell of the second grid.

11. The system of claim 10, wherein the original location of the power line is inaccurate.

12. The system of claim 10, wherein the operations further comprise generating a third grid by updating the values of the second grid to describe the updated location of the power line.

13. The system of claim 12, wherein the operations further comprise generating an updated raster image by combining the first grid with the third grid.

14. The system of claim 8, wherein selecting the set of candidate pixels is based at least in part on a number of pixels in between a candidate pixel of the set of pixels and a pixel describing the original location of the power line.

15. A computer program product comprising a computer readable storage medium having program instructions embodied therewith, the program instructions executable by a processor to cause the processor to perform operations comprising:
generating a combined raster image from point cloud data and reference data describing an original location of a power line;
selecting a set of candidate pixels from the combined raster image describing an updated location of a power line, wherein the selection is based at least in part on a location of pixels in the combined raster image that describes the original location;
detecting pixels from the set of candidate pixels that describe an updated location of a power line; and
modifying the combined raster image to reflect the updated location of the power line.

16. The computer program product of claim 15, wherein generating the combined raster image comprises:

segmenting point cloud data over a target area into a first grid, wherein each cell of the first grid is associated with a geospatial portion of the target area, and wherein each pixel of the combined raster image is associated with a cell of the first grid;

determining a respective value of a first characteristic for each cell of the first grid; and determining a visual characteristic of each cell based on the respective value.

17. The computer program product of claim 16, wherein generating the combined raster image further comprises:

segmenting reference data over a target area into a second grid, wherein each cell of the second grid is associated with a geospatial portion of the target area, and wherein each pixel of the combined raster image is associated with a cell of the second grid; and combining the first grid and the second grid based on matching a geospatial portion associated with a first cell of the first grid with a geospatial portion associated with a first cell of the second grid.

18. The computer program product of claim 17, wherein the original location of the power line is inaccurate.

19. The computer program product of claim 17, wherein the operations further comprise generating a third grid by updating the values of the second grid to describe the updated location of the power line.

20. The computer program product of claim 19, the operations further comprise generating an updated raster image by combining the first grid with the third grid.

\* \* \* \* \*